(12) United States Patent
Petrus

(10) Patent No.: US 12,449,510 B2
(45) Date of Patent: Oct. 21, 2025

(54) DETERMINATION OF RADAR CROSS SECTIONS OF OBJECTS

(71) Applicant: BAE SYSTEMS PLC, London (GB)

(72) Inventor: Adam Thomas Petrus, Warton (GB)

(73) Assignee: BAE SYSTEMS PLC, London (GB)

( * ) Notice: Subject to any disclaimer, the term of this patent is extended or adjusted under 35 U.S.C. 154(b) by 439 days.

(21) Appl. No.: 17/796,956

(22) PCT Filed: Feb. 9, 2021

(86) PCT No.: PCT/GB2021/050287
§ 371 (c)(1),
(2) Date: Aug. 2, 2022

(87) PCT Pub. No.: WO2021/161000
PCT Pub. Date: Aug. 19, 2021

(65) Prior Publication Data
US 2023/0072805 A1 Mar. 9, 2023

(30) Foreign Application Priority Data

Feb. 10, 2020 (EP) .................................... 20275031
Feb. 10, 2020 (GB) .................................... 2001743

(51) Int. Cl.
| | |
|---|---|
| *G01S 7/41* | (2006.01) |
| *G01S 7/40* | (2006.01) |
| *G01S 7/02* | (2006.01) |
| *G01S 7/03* | (2006.01) |
| *G01S 13/90* | (2006.01) |

(52) U.S. Cl.
CPC . *G01S 7/41* (2013.01); *G01S 7/40* (2013.01)

(58) Field of Classification Search
CPC .. G01S 7/2923; G01S 7/4017; G01S 13/9064; G01S 7/00–41; G01S 13/00–90
(Continued)

(56) References Cited

U.S. PATENT DOCUMENTS 6,529,157 B1 3/2003 Mensa et al.
2007/0013579 A1* 1/2007 Picard ...................... G01S 7/41
342/159
(Continued)

FOREIGN PATENT DOCUMENTS

KR 20190059384 A 5/2019
WO WO-2002065154 A1 * 8/2002 ............. G01S 17/89

OTHER PUBLICATIONS

Amin, F., Mueed, A., & Jia-dong Xu. (2012). Implementation and results of an RCS measurement system in CATR. 2012 IEEE Asia-Pacific Conference on Applied Electromagnetics (APACE), 262â267. https://doi.org/10.1109/APACE.2012.6457673 (Year: 2012).*
(Continued)

*Primary Examiner* — Vladimir Magloire
*Assistant Examiner* — Remash R Guyah
(74) *Attorney, Agent, or Firm* — Scully, Scott, Murphy & Presser, P.C.

(57) ABSTRACT

Provided is a method and system for measuring a radar cross section of an object (102). The method comprises: transmitting one or more radar pulses (402) to the object (102), each of the one or more pulses (402) having a predetermined pulse profile; for each of the one or more pulses (402), measuring a pulse return, the pulse return being the radar pulse (402) reflected by the object (102); deconvolving the measured one or more pulse returns using the predetermined pulse profile; and determining the radar cross section of the object (102) using the deconvolved one or more pulse returns.

18 Claims, 4 Drawing Sheets

(58) Field of Classification Search
USPC ....... 342/174, 165, 195, 25, 89–90, 95, 159, 342/196, 201; 702/76, 189; 324/76.12; 356/4.01
See application file for complete search history.

(56) References Cited

U.S. PATENT DOCUMENTS

| | | | | |
|---|---|---|---|---|
| 2012/0283987 | A1* | 11/2012 | Busking | G01S 13/82 702/159 |
| 2019/0302253 | A1* | 10/2019 | Santra | G01S 7/415 |
| 2019/0353768 | A1* | 11/2019 | Hoshuyama | G01S 13/90 |
| 2020/0096630 | A1* | 3/2020 | Fox | G01S 13/9056 |
| 2020/0121215 | A1* | 4/2020 | Hyde | G01S 7/40 |
| 2021/0290074 | A1* | 9/2021 | Ertin | A61B 5/0537 |

OTHER PUBLICATIONS

C. Alexandrov, "Radar target signature evaluation using numerical deconvolution," 2014 18th International Symposium on Electrical Apparatus and Technologies (SIELA), Bourgas, Bulgaria, 2014, pp. 1-4, doi: 10.1109/SIELA.2014.6871842. (Year: 2014).*

International Search Report and Written Opinion dated Mar. 23, 2021 issued in PCT/GB2021/050287.

Extended European Search Report dated Sep. 1, 2020 issued in EP 20275031.1.

GB Search Report dated Jun. 12, 2020 issued in GB 2001743.0.

Van Cappelle W A et al., "Potentials of Ultra-Short-Pulse Time-Domain Scattering Measurements", IEEE Antennas and Propagation Magazine, IEEE Service Center, Piscataway, NJ, US, vol. 42, No. 4, Aug. 1, 2000 (Aug. 1, 2000), pp. 35-45.

Alexandrov Chavdar, "Radar target signature evaluation using numerical deconvolution", 2014 18th International Symposium on Electrical Apparatus and Technologies (SIELA), IEEE, May 29, 2014 (May 29, 2014), pp. 1-4.

Faisal Amin et al., "Implementation and results of an RCS measurement system in CATR", Applied Electromagnetics (APACE), 2012 IEEE Asia-Pacific Conference on, IEEE, Dec. 11, 2012 (Dec. 11, 2012), pp. 262-267.

International Preliminary Report on Patentability and Written Opinion dated Aug. 25, 2022 issued in PCT/GB2021/050287.

* cited by examiner

DETERMINATION OF RADAR CROSS SECTIONS OF OBJECTS

FIELD OF THE INVENTION

The present invention relates to measuring or determining the radar cross sections of objects.

BACKGROUND

Measuring the radar cross section of objects, particularly low radar-signature targets (such as low-observability aircraft, etc.), in an external environment is becoming increasingly difficult due to the amount of radio frequency interference (RFI) that is in existence from other transmitters such as mobile phones, TV, satellites and other radars such as Air Traffic Control radars.

Conventionally, this problem may be addressed by implementing a larger amplifier that allows for the signal-to-noise ratio to be increased.

However, use of a larger amplifier and a higher power signal may cause unwanted disruption to other transmissions in the areas and, as such, use of the larger amplifier and higher power signal may be restricted or not permitted.

SUMMARY OF THE INVENTION

Conventionally, a radar cross section profile for a target on a test range is acquired by sweeping the frequency of transmitted radar signals to measure the target.

In contrast, the present invention uses time-gating and employs capabilities of radar systems and post processing software to effectively "walk" transmitted radar pulses along the test range, in which the target being measured is located.

The target is measured by a sequence of radar pulses, each having the same frequency or narrow frequency range at which there is a low level of RFI. For each pulse, a radar receiver measures a return for that pulse after a respective delay time has elapsed from the transmission of that pulse. The delay times for the sequence of radar pulses are varied, for example the delay time may be increased by a fixed time, for each successive pulse in the sequence of radar pulses. Thus, each pulse measures a target at a respective distance (or range) from the radar antenna. In this way, information from the target is obtained to produce a downrange profile for the target. This advantageously tends to mitigate against RFI. Also, use of expensive, large amplifiers and higher power transmission tends to be avoided.

The technique can be utilised on all range radar systems where RFI is a problem.

In a first aspect, the present invention provides a method of measuring a radar cross section of an object. The method comprises: transmitting one or more radar pulses to the object, each of the one or more pulses having a predetermined pulse profile; for each of the one or more pulses, measuring a pulse return, the pulse return being the radar pulse reflected by the object; deconvolving the measured one or more pulse returns using the predetermined pulse profile; and determining the radar cross section of the object using the deconvolved one or more pulse returns.

The one or more pulses may be transmitted at a predetermined frequency. The method may further comprise determining the frequency at which to transmit the one or more radar pulses. The determining of the frequency may comprise performing a radio frequency interference listening test to determine a level of radio frequency interference at a plurality of different frequencies, and selecting a frequency from the plurality of different frequencies at which there is a minimum level of radio frequency interference.

The one or more radar pulses may be transmitted and received by a radar antenna. The measuring of the one or more pulse returns may comprise time-gating the radar return to measure the object at a plurality of different distances from the radar antenna.

The method may further comprise determining a regularisation constant, wherein the deconvolving of the one or more measured pulse returns is performed using the determined regularisation constant. The deconvolving of the one or more measured pulse returns may comprises calculating $H_f$, where:

$$H_f = \frac{P_f^* W_f}{(P_f^* P_f + \gamma)\Delta t}$$

where: $H_f$ is a discrete Fourier Transform of a radar profile of the object; $\gamma$ is the regularisation constant (which may be a positive real number); $P_f$ is a discrete Fourier Transform of a reference pulse; $P_f^*$ is the complex conjugate of $P_f$; and $\Delta t$ is a time period.

The method may further comprise determining a scaling constant, and multiplying $H_f$ by the scaling constant. The determining of the scaling constant may comprise performing a calibration process. The calibration process for determining the scaling constant may comprise: transmitting the radar pulse to a calibration target, the calibration target being an object having a known radar cross section; measuring a calibration pulse return associated with the radar pulse that has been transmitted to the calibration target; identifying a peak of the measured calibration pulse return; coherently summing the radar energy over the identified peak; and determining, as the scaling constant, the constant value by which the summed energy value is multiplied to achieve a known calibration level for the calibration target. The determining of the regularisation constant may comprises performing a calibration process. The calibration process for determining the regularisation constant may comprise: transmitting the radar pulse to a calibration target, the calibration target being an object having a known radar cross section; measuring a calibration pulse return associated with the radar pulse that has been transmitted to the calibration target; identifying a section of the measured calibration pulse return at which the calibration target is not located; determining a noise level of the identified section; defining a signal-to-noise level using the determined a noise level and the measured calibration pulse return; selecting an initial value of the regularisation constant; and performing an optimisation process on the initial value of the regularisation constant to determine a refined regularisation constant corresponding to a largest signal-to-noise level. The refined regularisation constant may be the regularisation constant used in the deconvolving of the measured pulse return. The optimisation process comprises deconvolving the measured calibration pulse return using varying values for the regularisation constant. The optimisation process may comprise implementing the Newton-Raphson method.

The method may further comprise determining a pulse width for the one or more pulses. The one or more pulses may be transmitted having the determined pulse width. Determining the pulse width may comprise: transmitting and measuring a radar pulse having an initial pulse width; iteratively increasing the initial pulse width by an increment value until a nominal maximum signal amplitude is measured; and setting the pulse width equal to the pulse width associated with the nominal maximum signal amplitude.

The method may further comprise rotating the object during the transmission of the radar pulse, and interpolating the measured pulse return onto a fixed angular grid. The deconvolving of the measured pulse return may be performed for each angle in the fixed angular grid. An angular step size of the fixed angular grid may be equal to a maximum discrete Fourier Transfer frequency.

In a further aspect, the present invention provides a system for measuring a radar cross section of an object. The system comprises: a radar transmitter configured to transmit one or more radar pulses to the object, the one or more radar pulses having a predetermined pulse profile; a radar receiver configured to measure one or more pulse returns, the one or more pulse returns being the one or more radar pulses reflected by the object; and one or more processors configured to: deconvolve the one or more measured pulse returns using the predetermined pulse profile; and determine the radar cross section of the object using the deconvolved one or more pulse returns.

DETAILED DESCRIPTION

Figure 1:
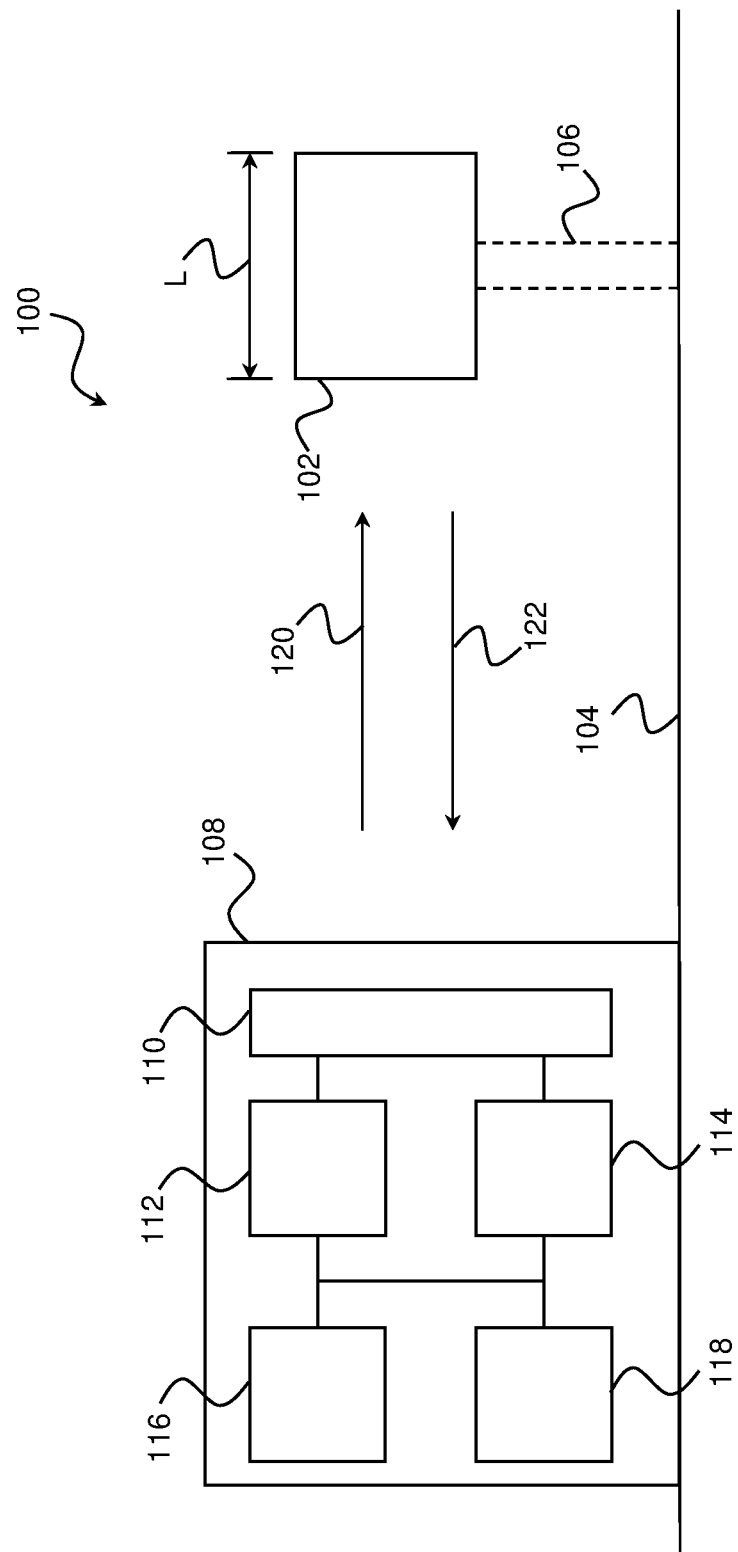
FIG. 1 is a schematic illustration (not to scale) showing a system for measuring a radar cross section of a target.

FIG. 1 is a schematic illustration (not to scale) showing a system 100 for measuring a radar cross section (RCS) of a target 102.

The target 102 may be any appropriate type of object for which it is desired to know the RCS. For example, the target 102 may be an aircraft, and the RCS of the aircraft is to be measured to assess a mission limitation or performance of the aircraft. The target 102 is located at one end of a test range 104. The target 102 is mounted to a support structure 106 that holds the target 102 above the ground. The support structure 106 is configured to continuously rotate the target 102 as it is measured by a radar module 108.

The radar module 108 is located at the opposite end of the test range 104 to the target 102. The radar module 108 comprises a radar antenna 110, a radar transmitter 112, a radar receiver 114, a radar controller 116, and a radar signal processor 118.

The radar module 108 may operate in a transmit mode, to transmit radar waves down the test range 104 to the target 102, or in a receive mode, to receive radar waves reflected from the target 102.

The radar controller 116 may be configured to control all aspects of operation of the radar module 108. The radar controller 116 is configured to, during transmit mode, determine and generate an appropriate waveform to be transmitted by the radar antenna 110. The radar controller 116 is operatively coupled to the radar transmitter 112. The radar controller 116 is configured to send the generated waveform to the radar transmitter 112. The radar transmitter 112 is operatively coupled to the radar antenna 110. The radar transmitter 112 is configured to boost the power of the received waveform and send the energy to the radar antenna 110 for transmission. The radar antenna 110 is configured to transmit the waveform received from the radar transmitter 112. The radar antenna 110 is directed down a length of the test range 104 towards the target 102.

Thus, radar waves transmitted by the radar antenna 110 (indicated in FIG. 1 by an arrow and the reference numeral 120) tend to impinge on the target 102. Also, incident radar waves reflected by the target 102 (indicated in FIG. 1 by an arrow and the reference numeral 122) tend to be incident on and received by the radar antenna 110.

The radar antenna 110 is also operatively coupled to the radar receiver 114. The radar receiver 114 is operatively coupled to the radar signal processor 118. The radar receiver 114 is configured to, during receive mode, collect signals from the radar antenna 110 and forward them to the radar signal processor 118.

The radar signal processor 118 is configured to process the signals received from the radar receiver 114 (i.e. signals corresponding to radar waves reflected from the target 102) and to process those signals to determine an RCS of the target 102. This signal processing may use an input received by the radar signal processor 118 from the radar controller 116. This signal processing is described in more detail later below with reference to FIGS. 2 and 3.

Apparatus, including the radar controller 116 and/or the radar signal processor 118, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
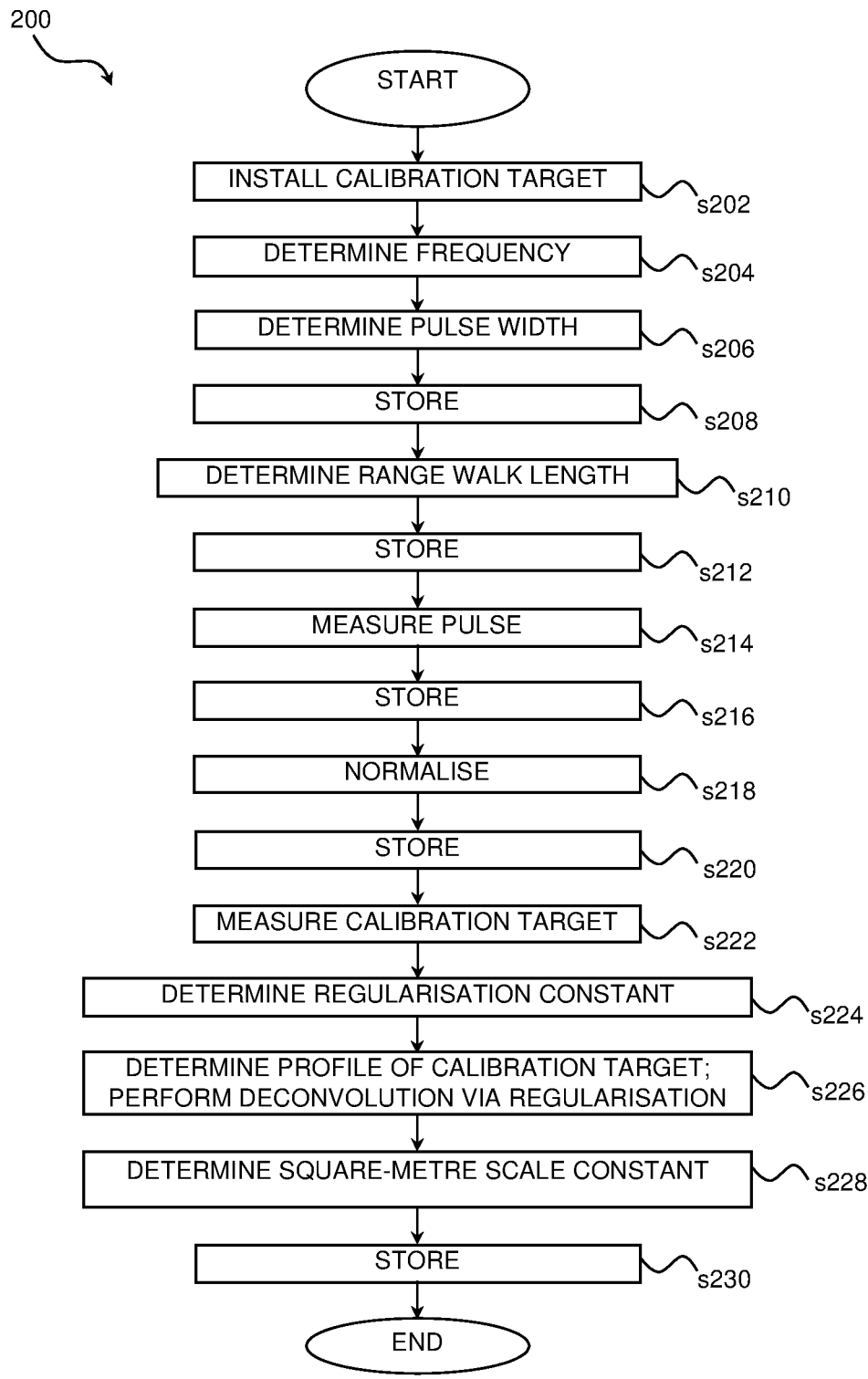
FIG. 2 is a process flow chart showing a calibration process for calibrating the RCS measurement system.
Figure 3:
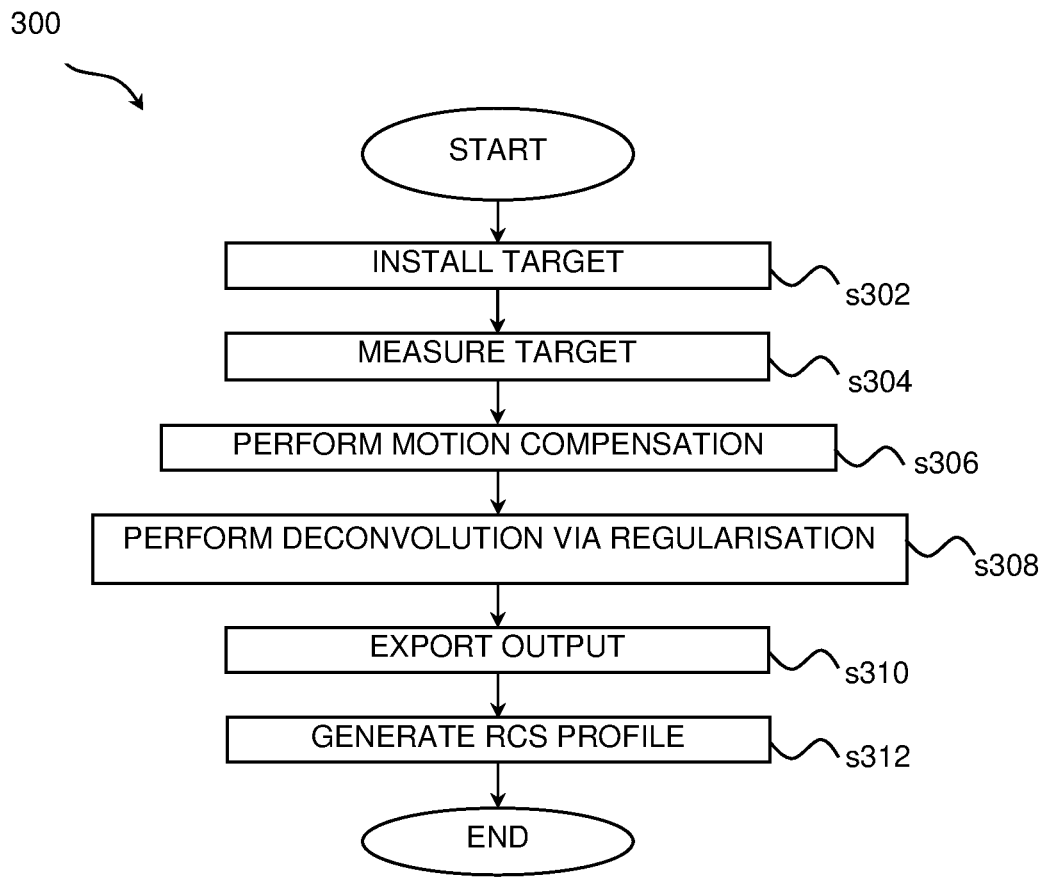
FIG. 3 is a process flow chart showing a process for measuring the RCS of the target.

What will now be described with reference to FIGS. 2 and 3 are methods that may be performed by the system 100 shown in FIG. 1 and described in more detail above. It should be noted that certain of the process steps depicted in the flowcharts of FIGS. 2 and 3 and described below may be omitted or such process steps may be performed in differing order to that presented below and shown in FIGS. 2 and 3. Furthermore, although all the process steps have, for convenience and ease of understanding, been depicted as discrete temporally-sequential steps, nevertheless some of the process steps may in fact be performed simultaneously or at least overlapping to some extent temporally.

FIG. 2 is a process flow chart showing certain steps of a calibration process 200 for calibrating the RCS measurement system 100.

At step s202, a calibration target is installed on the test range 104. In this embodiment, the calibration target is mounted to the support structure 106.

The calibration target is an object having a known RCS signature. Examples of appropriate calibration targets include, but are not limited to, spherical or dihedral objects.

At step s204, a specific frequency for radar transmission is determined or selected. This may be performed, for example, by the radar controller 116. Preferably, a specific frequency at which there is a low or minimum level of RFI is chosen. More preferably, a specific frequency at which there is a substantially no RFI is chosen. The determination or selection of the specific frequency may comprise performing an RFI listening test in the vicinity of the system, and selecting a frequency at which there is a low, minimum, or no RFI.

At step s206, a pulse width for radar transmission is determined or selected. This may be performed, for example, by the radar controller 116.

In this embodiment, the pulse width is determined by measuring an internal loop of the radar module 108. In this embodiment, the transmission line of the radar module 108 is wired directly into the receiver 114, which defines the internal loop of the radar module 108. In some embodiments, an attenuator may be inserted to reduce the power such that the receiver 114 is not damaged by signals received from the transmitter 112. In this embodiment, the internal loop of the radar module 108 is measured using a small initial minimum pulse width (e.g. a pulse width of less than or equal to 5 nanoseconds, such as 1 ns, 2 ns, 3 ns, 4 ns, or 5 ns, or less than or equal to 10 nanoseconds) and iteratively increasing the initial pulse width by small increments (e.g. about 2 wavelengths, e.g. about 1 ns or about 2 ns) until a nominal maximum signal amplitude is achieved. That the nominal maximum signal amplitude has been achieved may be determined in any appropriate way. For example, the nominal maximum signal amplitude may be deemed to have been achieved in response to the return voltage (from the pulse sent via the radar module's internal loop) not increasing (or increasing by less than a threshold amount, e.g. about 0.3 dB) after two iterative step increases of the pulse width have been made.

At step s208, the determined pulse width is stored, for example in a memory of the radar module 108.

At step s210, a range walk length is determined or selected. This may be performed, for example, by the radar controller 116.

In this embodiment, the range walk length is based on one or both of the length of the target 102 in a direction along length of the test range 104 (as indicated in FIG. 1 and the reference symbol L), and the pulse width (determined at step s206). For example, the range walk length may be determined as:

$$R = L + 2p_w + A \qquad \text{(Eq. 1)}$$

Where: R=range walk length;
L=is the swept length of the target. (If the target is not placed with its geometric centroid on the centre of rotation but instead at an offset location, then the target will sweep out a larger length when rotated);
$p_w$=pulse width (the term $2p_w$ corresponds to a pulse width distance in front of and behind the target 102); and
A=an additional distance to account for multipath returns, i.e. radar returns that result from scattering of multiple locations on the target 102. This additional length A may be dependent on the length of the target 102 (e.g. about 50% of the length of the target 102).

At step s212, the determined range walk length (e.g. the determined sample length and number of samples) is stored, for example in a memory of the radar module 108.

At step s214, a reference pulse of the radar module 108 is measured.

In this embodiment, the radar controller 116 controls the radar transmitter 112 to transmit the reference pulse having the specific frequency and the pulse width determined at steps s204 and s206 respectively. The output of the radar transmitter 112 is looped back into the radar receiver 114. In other words, the impulse is measured using the internal loop of the radar module 108 without a signal being transmitted from the radar antenna 110.

In some embodiments, attenuators are inserted in the internal loop to protect the radar receiver 114 and to prevent saturating analog-to-digital (A2D) convertors.

At step s216, the measured reference pulse may be stored, for example in a memory of the radar module 108.

At step s218, the measured reference pulse is normalised. In this embodiment, the normalised reference pulse defines the parameter p(t), which is used in post-processing as described in more detail later below. The normalisation may be performed, for example, by the radar signal processor 118. The normalisation may comprise: calculating the centre of the reference pulse, for example, using the mid-point between a defined rise and fall percentile of the measured reference pulse; rotating the phase of the measured reference pulse, for example, such that the imaginary component is zero at the pulse centre; and optionally windowing/filtering out (i.e. removing) a tail end of the reference pulse in a region where ring down is present.

In this embodiment, the phase of the measured reference pulse is normalised (e.g. to zero). Also, in this embodiment, the magnitude of the measured reference pulse is normalised (e.g. to unity).

In this embodiment, the measured reference pulse is processed in preparation for the later deconvolution stage (see step s226 described in more detail later below).

At step s220, the normalised reference pulse p(t) is stored, for example in a memory of the radar module 108.

At step s222, the radar module 108 measures the calibration target. In this embodiment, a "range walk" measurement of the calibration target is performed.

Figure 4A:
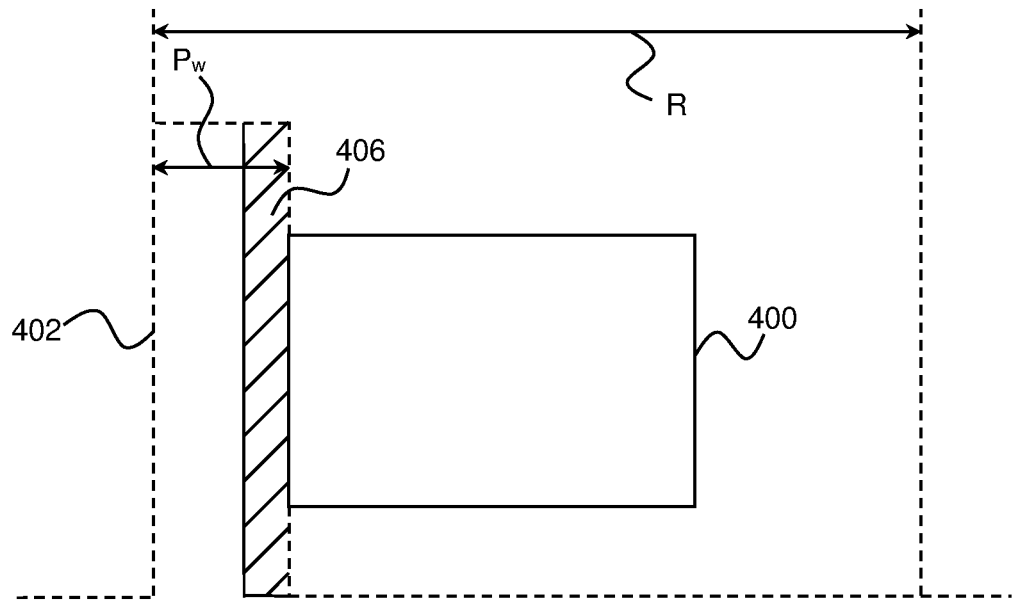
FIGS. 4a and 4b are schematic illustrations (not to scale) illustrating a range walk measurement of a calibration target performed during the process of FIG. 3.
Figure 4B:
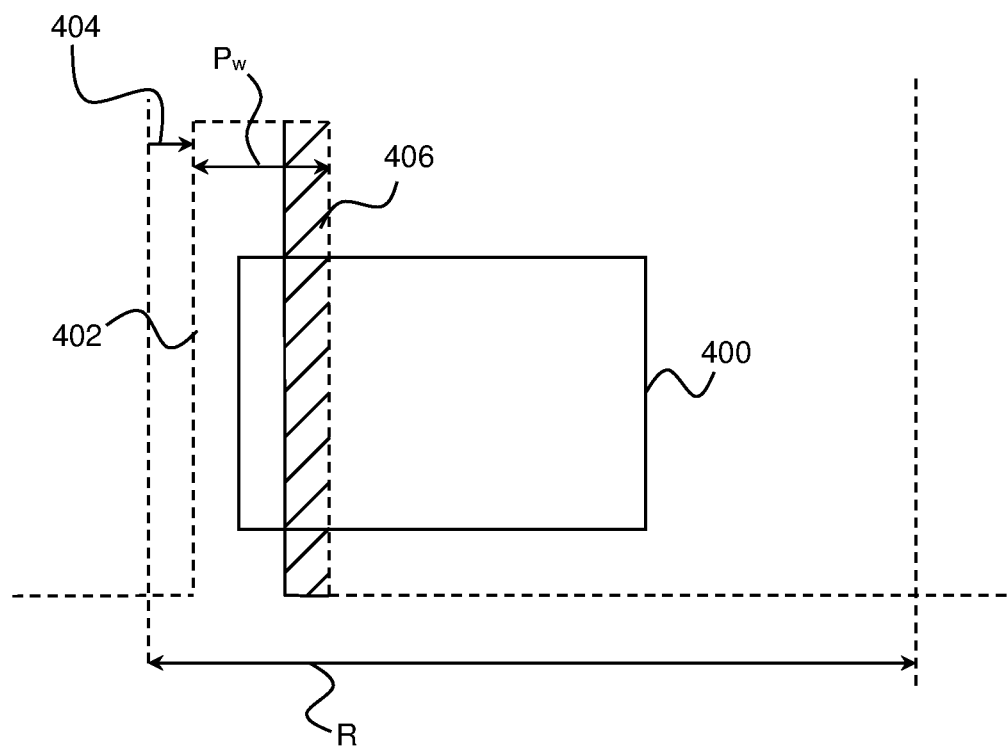

FIGS. 4a and 4b are schematic illustrations (not to scale) illustrating the measurement of the calibration target 400 performed at step s222. In this embodiment, the calibration target is measured using a sequence of radar pulses. FIG. 4a illustrates a first pulse in the sequence of radar pulses, and FIG. 4b illustrates a second pulse in the sequence of pulses, the second pulse being subsequent to the first pulse in the sequence.

In this embodiment, the radar controller 116 determines and generates an appropriate waveform of pulses 402 that are to be transmitted to the calibration target 400. In this embodiment, the pulses 402 that are to be transmitted have pulse widths equal to the pulse width $p_w$ determined at step s206. The determined range walk length R may define the number of samples (i.e. the number of pulses in the sequence). The radar controller 116 sends the generated waveform to the radar transmitter 112. The radar transmitter 112 boosts the power of the received waveform and sends the energy to the radar antenna 110. The radar antenna 110 transmits 120 the sequence of pulses 402 towards the calibration target 400. The pulses 402 are transmitted at the specific frequency determined or selected at step s204. The calibration target reflects 122 the incident pulses 402. The reflected pulses are incident on the radar antenna 110. The radar receiver 114 collects signals from the radar antenna 110 corresponding to the reflected radar energy, and forwards them to the radar signal processor 118.

In this embodiment, the radar receiver 114 measures a return for each pulse 402 after a respective delay time has elapsed from the transmission of that pulse 402. The delay times for the sequence of radar pulses 402 are varied. This is achieved using time-gating of the receiver 114. In particular, in this embodiment, for each successive pulse 402 in the sequence of radar pulses, the delay time (from pulse transmission) before activating/opening the receiver 114 is increased by a fixed time, $\Delta t$.

Thus, in effect, each pulse 402 "measures" the calibration target 400 at a respective distance (or range) from the radar antenna 110. In other words, a plurality of samples are measured, each sample being a different, respective portion of the target 400 at a different respective distance from the radar module 108. Such samples or measurements are illustrated in FIGS. 4A and 4B by hashed areas and the reference numeral 406. In this way, a downrange image of the calibration target 400 is built up.

The following information is useful for understanding the later described deconvolution process.

The returned signals from a range walk measurement can be defined as:

$$w(t)=p(t)*h(t) \tag{Eq. 2}$$

where $p(t) \in \mathbb{R}$ is the normalised reference pulse and $h(t) \in \mathbb{R}$ is the downrange profile of the object(s) being measured. The measurements $w(t)$ can be measured by varying the sample position across the object, i.e. by performing a range-walk. To obtain a downrange profile for the object, the above equation, eq. 2, can be solved to determine $h(t)$.

The above equation, eq. 2, tends to be easier to solve in the frequency domain.

By the convolution theorem:

$$W(f)=P(f)H(f) \tag{Eq. 3}$$

Applying spectral division gives:

$$H(f) = \frac{W(f)}{P(f)} \tag{Eq. 4}$$

where: $H(f)=G(h(t))$,
$W(f)=G(w(t))$,
$P(f)=G(p(t))$, and
G is the Fourier transform, i.e.

$$G(f) = \int_{-\infty}^{\infty} g(t)e^{-2\pi i t f} dt$$

Once $H(f)$ is calculated, the Fourier transform may be inverted to obtain $h(t)$.

Using discrete pulses, the returns of which are measured at discrete time-periods separated by $\Delta t$, then:

$$W_t=(p_t*h_t)\Delta t \tag{Eq. 5}$$

where $h_t$, $w_t$, and $p_t$ correspond to $h(t)$, $w(t)$, and $p(t)$. $h_t$, $w_t$, and $p_t$ are sequences of values over time, $t=1, 2, 3, \ldots$.

In this case:

$$W_f=(P_fH_f)\Delta t \tag{Eq. 6}$$

for $f=0, 1, 2, 3, \ldots, N-1$,
where $H_f$, $W_f$, $P_f$ are the discrete Fourier Transforms of $h_t$, $w_t$ and $p_t$ respectively; and
N is the number of discrete points in each of the series $H_f$, $W_f$, $P_f$, $k_t$, $w_t$, and $p_t$.

Solving for $H_f$ gives:

$$H_f = \frac{W_f}{P_f \Delta t} \tag{Eq. 7}$$

Once the vector $H_f$ has been calculated, the discrete Fourier Transform can be inverted to obtain $h(t)$. However, the denominator of Eq. 7, i.e. $P_f$, may be zero, at least for some frequencies. Thus, $H_f$ may be undefined and the discrete Fourier Transform may not be invertible. Even if $P_f$ is non-zero, it may be small for some frequencies. If there is noise in $P_f$ at such a frequency, then that noise will be greatly amplified.

There are a number of methods to handle this problem. By way of example, Tikhonov regularisation may be performed to address the problem of zero or small values of $P_f$ or undefined $H_f$. Using Tikhonov regularization, Eq. 7 becomes Eq. 8.

$$H_f = \frac{P_f^* W_f}{(P_f^* P_f + \gamma)\Delta t} \tag{Eq. 8}$$

where $\gamma$ is a chosen positive real number, hereinafter referred to as the "regularisation constant"), and $P_f^*$ is the complex conjugate of $P_f$.

Returning now to the description of the process of FIG. 2, at step s224 the regularisation constant, $\gamma$, is determined. This may be performed by the signal processor 118.

The choice of $\gamma$ is a trade-off between minimizing noise and damping. If $\gamma$ is too small, the solution will be very noisy at frequencies where $P_f$ is small. On the other hand, if $\gamma$ is too large, all of the frequencies will be damped out.

In this embodiment, a value of the regularisation constant, $\gamma$, is determined as follows.

First, a section (e.g. a leading section) of the measured radar return where no objects are expected is defined as a "noise region". A noise level is then determined by calculating the root-mean-squared value of the noise region. The peak return of the measurement and the calculated noise level are both used to define a signal-to-noise level. The deconvolution process (defined by eq. 8) is then performed multiple times, with varying values of $\gamma$. An initial value of $\gamma$ is chosen which corresponds to the largest signal-to-noise level. This initial value of $\gamma$ is then improved or optimised, e.g. using an appropriate optimisation process such as the Newton-Raphson method, to determine a refined value for $\gamma$. The optimisation process may comprise, for example, varying values of $\gamma$ until a substantially maximum (e.g. a local maximum) SNR is achieved; the value of $\gamma$ corresponding to the maximum SNR may be the "refined value for $\gamma$". The refined value for $\gamma$ may then be stored, e.g. in a memory of the radar module 108, for use with the measurements of the target 102, as described in more detail later below with reference to FIG. 3.

At step s226, using the determined refined/optimised regularisation constant $\gamma$, a downrange profile $h(t)$ is determined for the calibration target, i.e. the radar cross section of the target as a function of distance is determined. This may be performed by the signal processor 118.

In this embodiment, this is performed by performing deconvolution using the determined refined/optimised regularisation constant $\gamma$. More specifically, the profile of the calibration target is determined by calculating $H_f$ using eq. 8 above and transforming $H_f$ from the frequency domain into the time domain $h_t$, where $W_f$ is the discrete Fourier Transform of the measured returns $w_t$, $P_f$ is the discrete Fourier Transform of $p_t$ ($p_t$ being the internal loop-back representation of the transmitted pulse), $\gamma$ is the refined/optimised regularisation constant, and Δt is the time delta between the times from transmission at which successive pulses are measured by the receiver.

At step s228, a so-called "square-metre scale constant" is determined.

The data processing up to this point may be performed with raw uncalibrated data, i.e. the raw voltages measured on Analog-to-Digital (A2D) convertors within the radar module 108. In this embodiment, these voltages are multiplied by a constant to translate the power level to an equivalent square metre RCS level.

The square-metre scale constant may be determined by identifying a peak associated with the known calibration target and coherently summing the energy over the identified peak. The terminology "coherently summing" may be used herein to refer to summing of the complex numbers by summing the corresponding real and imaginary parts, i.e. as opposed to summing the magnitudes of complex numbers. The square-metre scale constant (i.e. the constant by which the summed energy value is multiplied to determine the known calibration level for the calibration target) is then determined.

At step s230, the determined square-metre scale constant is stored, e.g. in a memory of the radar module 108.

Thus, a calibration process 200 for calibrating the RCS measurement system 100 is provided. Various parameters for calibrating the radar system when measuring the target 102 are determined and stored. These parameters include refined/optimised regularisation constant γ and the square-metre scale constant.

FIG. 3 is a process flow chart showing certain steps of a method 300 for determining a RCS profile of the target 102. In this embodiment, the process of FIG. 3 is performed subsequent to the process of FIG. 2.

At step s302, the target 102 is installed on the test range 104. In this embodiment, the target 102 is mounted to the support structure 106 as described in more detail earlier above with reference to FIG. 1.

At step s304, the radar module 108 measures the target 102. In this embodiment, a "range walk" measurement of the target 102 is performed. This may be performed in the same way as for the calibration target as described in more detail earlier above with reference to step s222 of FIG. 2, mutatis mutandis.

In this embodiment, the measurements of the target are taken using the same specific frequency as that determined at step s204, and with the same pulse width $p_w$ as that determined at step s206.

The measurements of the target 102 may be made at the Nyquist rate, i.e. the minimum sampling rate that satisfies the Nyquist sampling criterion for the radar signal(s) being used.

At step s306, the relative motion, i.e. rotation, of the target 102 with respect to the radar module 108 is compensated for. This motion compensation may be performed by signal post-processing performed by the radar signal processor 118.

In this embodiment, the target 102 is measured while it is continuously rotated. As such, the discrete returns at a given range may not be measured a constant angle. In this embodiment, to account for this motion, the radar return data (which may be quadrature or IQ signals) are interpolated onto a fixed angular grid with the angular step size set by the maximum discrete Fourier Transfer frequency. This tends to ensure that the Nyquist sampling criterion is satisfied. The angular step size of the fixed angular grid may be less than the Nyquist angle for the maximum frequency determined by taking the Fourier transform of w(t), h(t), or p(t). Alternatively, the angular step size of the fixed angular grid may be (4cΔt)/L radians. The angular step size of the fixed angular grid may be the minimum of the Nyquist angle for the maximum frequency determined by taking the Fourier transform of w(t), h(t) or p(t) and (4cΔt)/L radians.

At step s308, for each angle in the fixed angular grid, deconvolution via regularisation is performed. This may be performed by the radar signal processor 118.

More specifically, in this embodiment, a deconvolution process is performed on each interpolated discrete angle in the angular grid using the calibration parameters determined during the calibration process described in more detail above, namely the refined/optimised regularisation constant γ and the square-metre scale constant.

The deconvolution process of this embodiment comprises calculating $H_f$ using eq. 8 above.

The right-hand side of equation 8 above may be multiplied by the square-metre scale constant to scale the value to a calibrated scale.

The deconvolution via regularisation process performed at step s308 produces a downrange profile of the target 102.

At step s310, the output of the deconvolution via regularisation process, i.e. the downrange profile of the target 102, is exported to compatible format for analysis in Inverse Synthetic Aperture Radar (ISAR) imaging software. For example, certain ISAR imaging software uses frequency domain data.

At step s310, using ISAR imaging software, the RCS signature of the target 102 is generated.

Thus, a method for determining a RCS profile of the target 102 is provided.

The above-described methods and apparatus measure the target using a series of radar pulses having the same specific frequency. This specific frequency is one at which there is a low level of RFI. Advantageously, this tends to mitigate against the effects of RFI. Also, use of expensive, large amplifiers and higher power transmission tends to be avoided.

The above-described system and methods measure tend to allow for or improve the measurement of the target at low frequencies. RFI at low frequencies tends to be worse than at higher frequencies, for example due the increased number of other transmitters operating at those lower frequencies.

The above described system and methods tend to facilitate assessment of the target (for example assessing a mission limitation or performance of an aircraft). Also, the above-described system and methods may be used to assess the performance of the radar system, for example with respect to a particular target, such as a particular type of aircraft.

The invention claimed is:

1. A method of measuring a radar cross section of an object, the method comprising:
   determining a pulse profile, the pulse profile including a pulse frequency and a pulse width;
   determining a range walk length, where a number of radar pulses to be transmitted in a sequence of radar pulses is based on the range walk length, where each radar pulse in the sequence has the determined pulse profile,
   for each radar pulse in the sequence,
      transmitting said radar pulse to the object measuring a pulse return value at a predetermined delay time from the transmitting of said radar pulse, the pulse return value at the predetermined delay time being the pulse return value of the radar pulse reflected by the object at a given distance along the object, where the predetermined delay time for each radar pulse in the sequence of radar pulses is different;

performing a Fourier transform on a normalized value of said radar pulse;

performing a Fourier transform on the measured pulse return value;

dividing the Fourier transform on the measured pulse return value by the Fourier transform on the normalized value of said radar pulse to obtain a divided value; and performing an inverse Fourier transform on the divided value to determine the radar cross section of the object at a given distance.

2. The method of claim 1, wherein the range walk length is determined by $R=L+2p_w+A$, where R is the range walk length, $p_w$ is the pulse width, L is a length of the object, and A is an additional distance based on a multipath return.

3. The method of claim 1, wherein the pulse frequency is determined by performing a radio frequency interference listening test to determine a level of radio frequency interference at a plurality of different frequencies within a particular area, and selecting a frequency from the plurality of different frequencies at which there is a minimum level of radio frequency interference.

4. The method of claim 1, wherein:

each radar pulse in the sequence is transmitted and each pulse return value is received by a radar antenna; and the measuring of each pulse return value comprises time-gating the pulse return value to measure the object at a plurality of different distances from the radar antenna.

5. The method of claim 1, further comprising determining a regularisation constant, wherein the Fourier transform of each measured pulse return value is performed using the determined regularisation constant.

6. The method of claim 5, wherein the Fourier transform of each measured pulse return value comprises calculating $H_f$, where:

$$H_f = \frac{P_f^* W_f}{(P_f^* P_f + \gamma)\Delta t}$$

where: $H_f$ is a discrete Fourier Transform of a radar profile of the object $\gamma$ is the regularisation constant;

$P_f$ is a discrete Fourier Transform of a reference pulse;

$W_f$ is the discrete Fourier Transform of the measured pulse return value;

$P_f^*$ is the complex conjugate of $P_f$, and $\Delta t$ is a time period.

7. The method of claim 6, further comprising determining a scaling constant, and multiplying $H_f$ by the scaling constant.

8. The method of claim 7, wherein:

the determining a scaling constant comprises performing a calibration process; and the calibration process comprises:

transmitting a radar pulse to a calibration target, the calibration target being an object having a known radar cross section;

measuring a calibration pulse return value associated with the radar pulse that has been transmitted to the calibration target;

identifying a peak of the measured calibration pulse return;

coherently summing the radar energy over the identified peak; and determining, as the scaling constant, a constant value by which the summed energy value is multiplied to achieve a known calibration level for the calibration target.

9. The method of claim 5, wherein:

the determining of the regularisation constant comprises performing a calibration process;

the calibration process comprises:

transmitting a radar pulse to a calibration target, the calibration target being an object having a known radar cross section;

measuring a calibration pulse return value associated with the radar pulse that has been transmitted to the calibration target;

identifying a section of the measured calibration pulse return value at which the calibration target is not located;

determining a noise level of the identified section;

defining a signal-to-noise level using the determined a noise level and the measured calibration pulse return value;

selecting an initial value of the regularisation constant; and performing an optimisation process on the initial value of the regularisation constant to determine a refined regularisation constant corresponding to a largest signal-to-noise level; wherein the refined regularisation constant is the regularisation constant used in the Fourier transform of the measured pulse return value.

10. The method of claim 9, wherein the optimisation process comprises performing a Fourier transform on the measured calibration pulse return value using varying values for the regularisation constant.

11. The method of claim 9, wherein the optimisation process comprises implementing the Newton-Raphson method.

12. The method of claim 1, wherein the pulse width is determined by:

transmitting a radar pulse having an initial pulse width and measuring a radar pulse return value;

iteratively increasing the initial pulse width by an increment value until a nominal maximum signal amplitude is measured; and setting the pulse width in the pulse profile equal to the pulse width associated with the nominal maximum signal amplitude.

13. The method of claim 1, wherein:

the method further comprises:

rotating the object during the transmission of a radar pulse; and interpolating the measured pulse return value onto a fixed angular grid; and the Fourier transform of the measured pulse return value is performed for each angle in the fixed angular grid.

14. The method of claim 13, wherein an angular step size of the fixed angular grid is equal to a maximum discrete Fourier Transfer frequency.

15. A system for measuring a radar cross section of an object, the system comprising:

a radar controller configured to determine a pulse profile, the pulse profile including a pulse frequency and a pulse width and to determine a range walk length, where a number of radar pulses to be transmitted in a sequence of radar pulses is based on the range walk length, where each radar pulse in the sequence has the determined pulse profile, a radar transmitter configured to transmit a sequence of radar pulses to the object;

a radar receiver configured to measure a pulse return value corresponding to a radar pulse in the sequence at a predetermined delay time from the radar pulse in the sequence, per each radar pulse in the sequence, wherein the predetermined delay time is different for each radar pulse in the sequence, a respective pulse return value at a respective predetermining time delay being a respective pulse return value corresponding to a respective radar pulse reflected by the object; and one or more processors configured to, for each radar pulse in the sequence:

perform a Fourier transform on a normalized value of said radar pulse;

perform a Fourier transform on the measured pulse return value;

divide the Fourier transform of the measured pulse return value by the Fourier transform on the normalized value of said radar pulse to obtain a divided value; and perform an inverse Fourier transform on the divided value to determine the radar cross section of the object at a given distance.

16. The system of claim 15, wherein the radar controller is configured to determine the range walk length by $R=L+2p_w+A$, where R is the range walk length, $p_w$ is the pulse width, L is a length of the object, and A is an additional distance based on a multipath return.

17. The system of claim 15, wherein the radar controller is configured to determine the pulse frequency by performing a radio frequency interference listening test to determine a level of radio frequency interference at a plurality of different frequencies within a particular area, and selects a frequency from the plurality of different frequencies at which there is a minimum level of radio frequency interference.

18. The system of claim 15, wherein the radar controller is configured to determine the pulse width by
   controlling the radar transmitter to transmitting a radar pulse having an initial pulse width and controlling the radar receiver to measure a pulse return value;
   iteratively increasing the initial pulse width by an increment value until a nominal maximum signal amplitude is measured; and
   setting the pulse width in the pulse profile equal to the pulse width associated with the nominal maximum signal amplitude.

* * * * *